United States Patent
Stava

(10) Patent No.: US 6,291,798 B1
(45) Date of Patent: Sep. 18, 2001

(54) ELECTRIC ARC WELDER WITH A PLURALITY OF POWER SUPPLIES

(75) Inventor: Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/406,406

(22) Filed: Sep. 27, 1999

(51) Int. Cl.$^7$ ........................................ B23K 9/10
(52) U.S. Cl. ............................................ 219/130.32
(58) Field of Search ............... 219/130.32, 130.1, 219/130.21, 130.31, 130.33; 363/26; 228/45

(56) References Cited

U.S. PATENT DOCUMENTS

| | | | |
|---|---|---|---|
| 4,330,074 | * | 5/1982 | Minkiewicz et al. ............... 228/45 |
| 4,425,613 | * | 1/1984 | Shelly .................................. 363/26 |
| 4,503,316 | * | 3/1985 | Murase et al. ................. 219/130.32 |
| 4,564,742 | * | 1/1986 | Karlsson ......................... 219/130.1 |
| 4,861,965 | | 8/1989 | Stava . |
| 4,947,021 | | 8/1990 | Stava . |
| 5,001,326 | | 3/1991 | Stava . |
| 5,349,157 | | 9/1994 | Blankenship . |
| 5,351,175 | | 9/1994 | Blankenship . |
| 5,434,768 | | 7/1995 | Jitaru et al. . |
| 5,811,757 | * | 9/1998 | Higgins .......................... 219/130.32 |
| 6,111,216 | | 8/2000 | Stava . |

* cited by examiner

Primary Examiner—Clifford C. Shaw
(74) Attorney, Agent, or Firm—Vickers, Daniels & Young

(57) ABSTRACT

An electric arc welder comprising a plurality of power supplies connected to a single welding station with a D.C. input for passing an arc welding current across an electrode and workpiece, each of the power supplies including a switching type inverter with an output D.C. current determined by a signal applied to the input of the power supply, a circuit connecting the output D.C. currents in parallel at the input of the welding station, a feedback circuit including a sensor for creating a current signal representing the arc current, a command signal source, and a circuit for creating a master current signal based upon the sensed current signal and the command signal, and a circuit for applying said master current signal to the input of the plurality of power supplies whereby the D.C. current to the D.C. input of the welding station is equally shared by the power supplies.

39 Claims, 5 Drawing Sheets

ELECTRIC ARC WELDER WITH A PLURALITY OF POWER SUPPLIES

INCORPORATION BY REFERENCE

The invention is particularly applicable for use with an output welding station having two transistor type switches for converting a D.C. current into an A.C. welding current. Consequently, it is a secondary aspect of the invention that the switching of the transistor type switches between the conductive state and the non-conductive state be accomplished at a reduced current to alleviate the need for a large snubber circuit around each output switch. This concept, together with the type of inverter power supply used in practicing the present invention, is disclosed in prior U.S. application Ser. No. 233,235 filed Jan. 19, 1999. This application is incorporated by reference herein for background information regarding the type of inverter power supply used in the present invention and the concept of turning the transistor type switches of the welding station off at a reduced current level. The invention controls a switching type welding station with high current inputs. The switches are turned off only when a lower current is flowing.

The present invention relates to the art of electric arc welding and more particularly to an improved electric arc welder constituting a plurality of separate power supplies.

BACKGROUND OF INVENTION

The present invention is particularly applicable to use in pipe welding and particularly for tandem electrodes or side-by-side electrodes used in pipe welding and it will be described with particular reference thereto; however, the invention has much broader applications and may be used for single electrode electric arc welders requiring extremely high current levels, such as welding currents exceeding about 1000–2000 amperes.

Electric arc welders for pipe welding and other similar applications often require welding currents in excess of 1000–2000 amperes. In the past, welders for developing such high welding currents were specially designed. However, when the required welding current increased beyond the design parameters of a particular power supply, a higher capacity electric arc welder had to be designed and manufactured. For instance, electric arc welders having a maximum current of 1000–1500 amperes could not be used for a welding operation requiring 2000 amperes. As soon as a higher capacity welder was manufacture and made available, it was again limited by its maximum current capacity. Consequently, as increased current levels were demanded for a welding application, such as pike welding, custom design, expensive welders were often necessitated.

Since higher welding currents required newly designed and manufactured welders, field applications could not be optimized due to the limited current capacity of the available power supply. Attempts have been made to create a high capacity welders by connecting a plurality of low capacity welders to the output welding station. Such attempts were not successful because there was difficulty balancing the dynamic current sharing capabilities of two or more separate power supplies.

SUMMARY OF INVENTION

Disadvantages of the prior attempts to provide high current power supplies, especially for pipe welding, have been overcome by the present invention which creates an electric arc welder that has an output current capability that is increased drastically by merely adding a plurality of power supplies, while still obtaining excellent static and dynamic current sharing capabilities between the paralleled power supplies. The electric arc welder of the present invention minimizes unequal current sharing between two or more power supplies. In prior schemes the power supplies each required an input command signal, its own feedback and error amplifier control circuit. They, thus suffer from lack of dynamic current shared between the power supplies due to component variations. The present invention utilizes the error amplifier of one power supply that not only controls the power supply, referred to as a master power supply, but also directs the same master current signal to the other power supplies. The other power supplies of the welder do not have their own command signal or error amplifier control circuitry. Consequently, only one error amplifier and feedback control circuit is provided in the electric arc welder. An error amplifier and feedback circuit is not used for each of the individual power supplies being parallel to increase the current capabilities.

In accordance with the present invention, there is provided an electric arc welder comprising a plurality of power supplies for creating a D.C. current of a given magnitude, which current is controlled by a single adjustable command signal. The D.C. current is used by a welding station having a D.C. input current and an output to pass an electric arc welding current between an electrode and a workpiece. A sensor, such as a shunt, senses the arc current. The plurality of power supplies includes a master power supply and one or more slave power supplies. The master power supply includes a first high speed switching type inverter having an output transformer and an output rectifier to produce a first D.C. current having a magnitude determined by a master current signal and a first pulse width modulator operated at a high frequency and having a current control voltage input controlled by the master current signal and an error amplifier for creating the master current signal based upon a comparison of the single command signal and the sensed arc current at the output of the welding station. The master power supply thus includes a command signal and an error amplifier feedback control circuit for controlling the pulse width modulator in the master power supply. The plurality of power supplies forming the welder includes at least one slave power supply which also includes a switching type inverter having an output transformer and an output rectifier to produce a second D.C. current having a magnitude determined by the same master current signal as used in the master power supply and a second pulse width modulator operated at a high frequency and having a current control voltage input connected to the master current signal of the master power supply. In this manner, the first and second D.C. currents combine to form at least a portion of the D.C. input current of the welding station. In practice, if two power supplies constitute the "plurality of power supplies" of the electric arc welder, the first D.C. current is 50% of the needed input current. The second D.C. current from the slave power supply provides the other 50% of the current. If three power supplies are used in the electric arc welder, each of the power supplies provides 33.3% of the input current for the output welding station. Consequently, the number of power supplies in the electric arc welder automatically determines the proportion of the D.C. current used to drive the welding station with the current being automatically balanced since each of the power supplies uses the same master current signal for the input of its pulse width modulator. A single command signal is used for the electric arc welder and only a single feedback circuitry is employed. By utilizing these novel concepts, a number of relatively small power supplies, such as 500 ampere power supplies, can be combined in any number to produce the desired maximum welding current. Six small power supplies, each rated for a maximum of 500 amperes, is combined to produce a 3000 ampere welding current. The ability to combine smaller power supplies to create an electric arc welder with an extremely high output welding current is obtained by the present invention. There is no need to design a power supply each time the current demand is increased.

In accordance with another aspect of the present invention, the high frequency used for the pulse width modulator of the individual power supplies is at least 18 kHz. In addition, the individual welding station driven by the plurality of power supplies includes first and second transistor type switches, such as 1 GBTs, shifted between a conductive state and a non-conductive state by the gate logic on a pair of control lines. In accordance with a secondary aspect of the invention, the switches are not shifted from the conductive state to a non-conductive state until the arc current is less than a given value. In practice, this given value is about 100–150 amperes. The invention uses a single welding station for a plurality of power supplies so large switches are needed and a single controller creates the logic signal to shift from conductive to non-conductive at the selected given value. The master power supply controls the switching and the slave or slaves merely add welding current.

In accordance with still a further aspect of the present invention, the output transformer in each of the power supplies includes a winding, specifically a primary winding, a current sensor associated with the winding and a circuit associated with the pulse width modulator of the individual power supply to hold at least one of the switches non-conductive for a time when the current in the winding exceeds a given current. This is referred to as the anti-core saturation circuit incorporated into a standard pulse width modulator chip and is used to prevent over current in the output welding station.

In accordance with another aspect of the present invention, the novel electric arc welder is used with a tandem and/or side-by-side welding machine, such as a pipe welder.

The primary object of the present invention is the provision of an electric arc welder which is assembled to produce high welding currents by combining a plurality of individual smaller power supplies while forcing the power supplies to share current equally.

Yet another object of the present invention is the provision of an electric arc welder, as defined above, which electric arc welder incorporates a plurality of paralleled power supplies, while obtaining an excellent static and dynamic current sharing between power supplies.

Still a further object of the present invention is the provision of an electric arc welder, as defined above, which electric arc welder uses a single current command signal, as well as a single error amplifier and feedback circuit, in analog or digital form, for controlling each of the individual power supplies to accurately share the current demands of the electric arc welder.

These and other objects and advantages will become apparent from the following description taken together with the accompanying drawings.

PREFERRED EMBODIMENT

Figure 1:
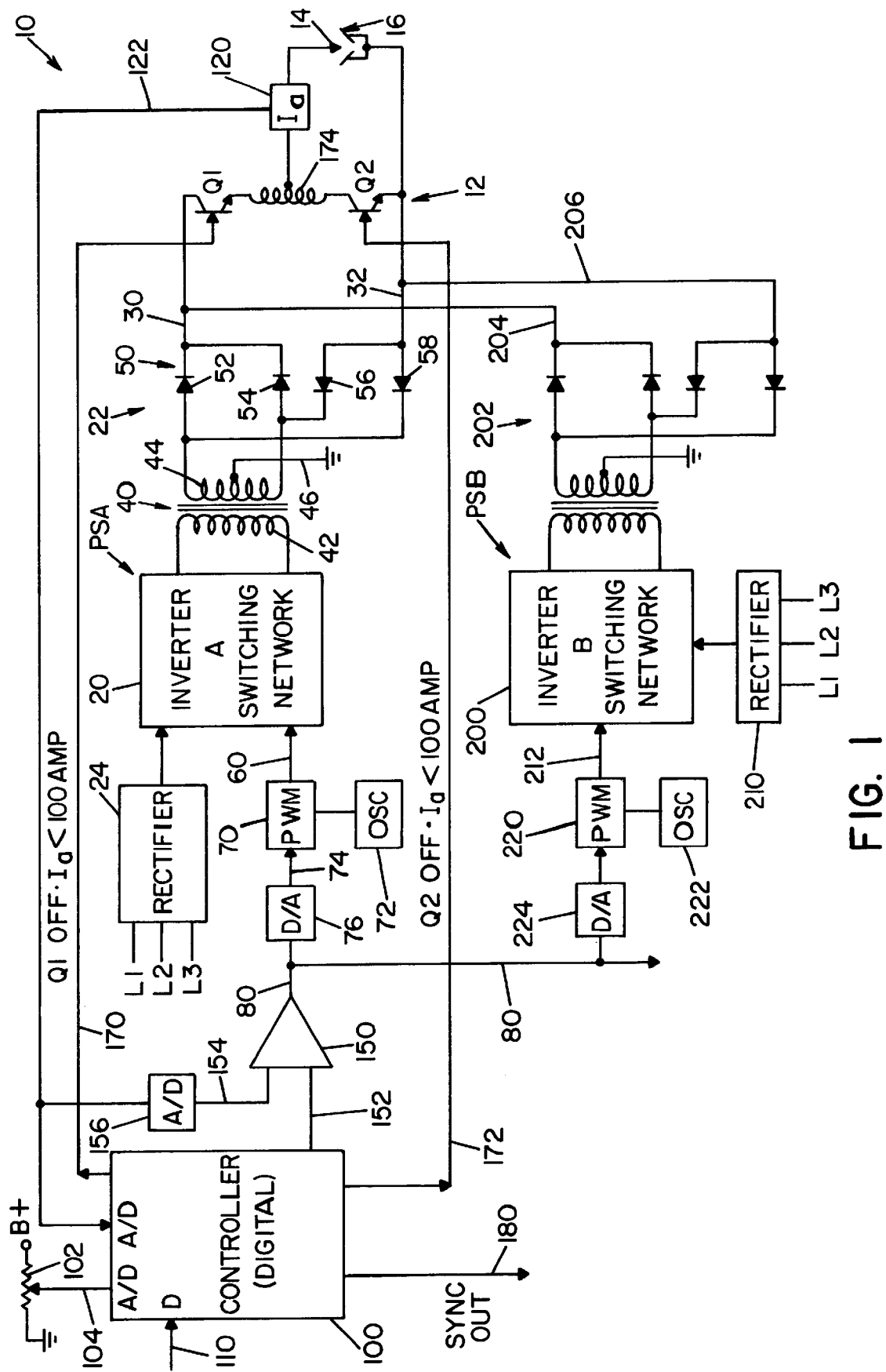
FIGS. 1 and 1A are combined wiring diagrams and block diagrams illustrating the preferred embodiment of the present invention.

Referring now to the drawings wherein the showings are for the purpose of illustrating preferred embodiments of the invention only and not for the purpose of limiting same, FIG. 1 shows an electric arc welder 10 for applying a D.C. welding current $I_a$ to a switching type welding station 12 having transistor type switches Q1, Q2 for passing the welding current across an electrode 14 and a workpiece 16. The seam is formed by two ends of a pipe section to be welded together or the elongated seam of a pipe mill. The electric arc welder has a plurality of inverter type power supplies, two of which are shown in FIG. 1 as power supply PSA and power supply PSB. Power supply PSA is a unique power supply used by assignee, The Lincoln Electric Company, which allows implementation of the present invention for applying a D.C. current at the input of welding station 12. Power supply PSA includes an inverter 20 of the switching type having a standard high frequency switching network for providing a D.C. current from output stage 22 by energy from rectifier 24 driven by a standard three phase line voltage L1, L2 and L3. Output stage 22 creates a D.C. current across the input terminals 30, 32 of welding station 12. The output stage has transformer 40 with primary winding 42 and secondary winding 44 with a grounded center tap 46. Rectifier stage 50 includes diode 52, 54, 56 and 58, poled as shown in FIG. 1, to create the D.C. current across terminals 30, 32 in accordance with the pulse signal on input line 60 to a standard pulse width modulator 70 operated at high frequency. The high frequency is greater than 18 kHz and is controlled by oscillator 72. In practice digital format is used. Thus, input 74, which is analog, is provided with D/A converter 76. Pulses on line 60 control the outputs D.C. current at terminals 30, 32 and the level of the current is determined by the voltage of the master current signal in line 80. Consequently, the magnitude of the voltage on line 80 determines the D.C. current applied by power supply PSA to input terminals 30, 32 of welding station 12. In accordance with the invention, the master current signal in line 80 is created by controller 100 which is a digital control circuit. Consequently, analog signals to controller 100 must be converted. The use of a digital representation of voltage on line 80 is preferred. The digital form allows transmission with little noise. Controller 100 has a standard command input signal which may be analog illustrated as the output of potentiometer 102 to control the voltage on line 104. Such analog command signal is used by controller 100 to determine the output operation of welding station 12. The analog voltage is converted from to digital at controller 100.

Figure 6:
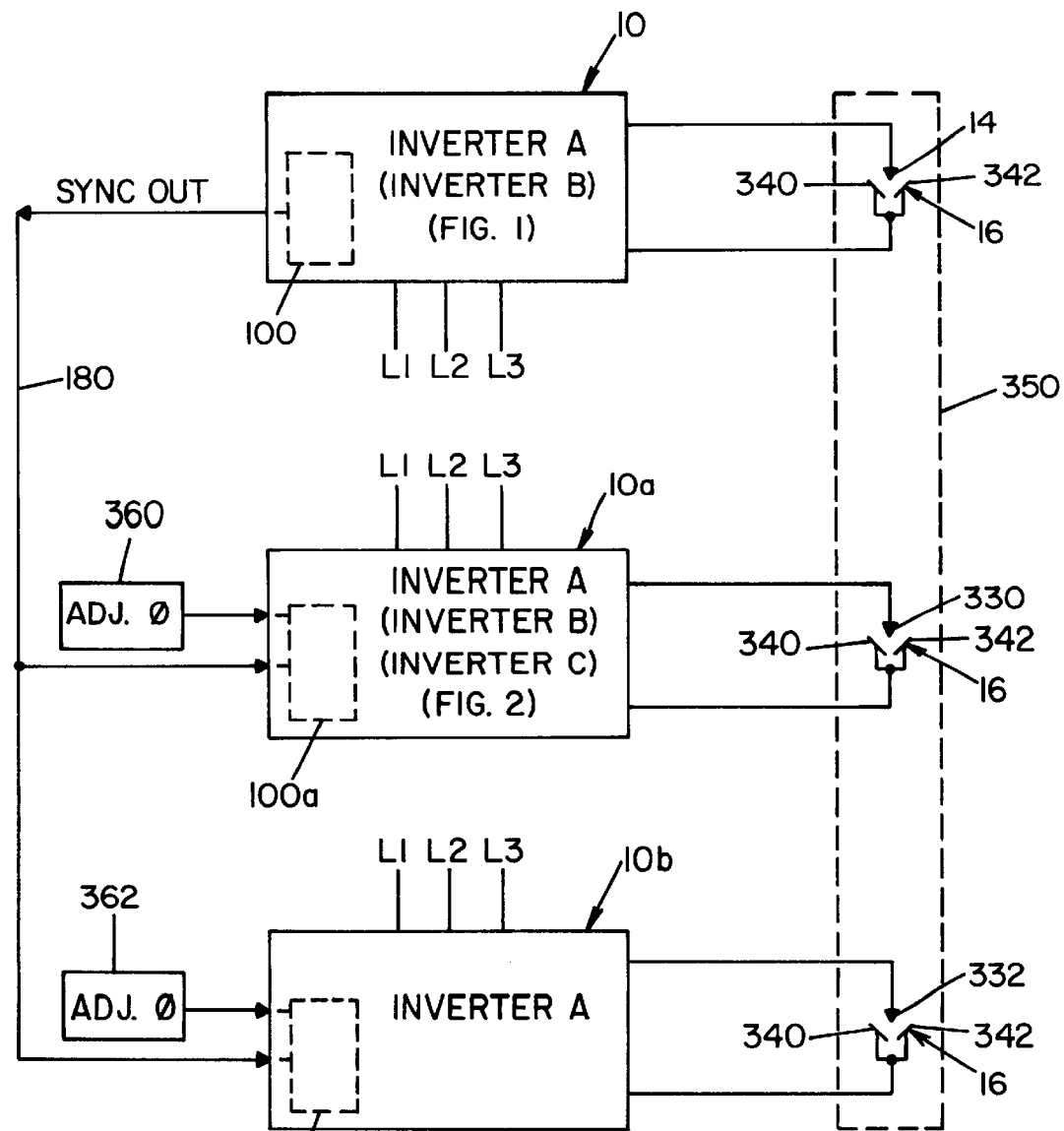
FIG. 6 is a block diagram showing the use of the present invention for both a tandem and a side-by-side arrangement of a plurality of electrodes used for pipe welding.

In the preferred implementation of the present invention, the command signal is a digital signal on line 110 directed to controller 100. A somewhat standard feedback circuit utilizes a welding current sensor 120, illustrated as a shunt, for providing a voltage representative of the arc current in line 122. This analog signal is directed to controller 100 where it is converted into a digital signal for processing in accordance with standard software. A digitally implemented error amplifier type circuit 150 receives a command signal controlled by the signal on line 104 or line 110 to form additional value on the first input line 152 to error amplifier 150. The other input 154 is a digital signal from converter 156 where the analog representation in line 122 is converted to a digital number. The two digital numbers in lines 152, 154 are processed in accordance with standard technology represented schematically as error amplifier 150 to create the master current signal, which is a digital number in line 80. Welding station 12 includes transistor type switches Q1 and Q2, such as IGBTs, that are shifted between the conductive and non-conductive state. The size of the switches is selected to accommodate the total weld current. Gate logic on lines 170, 172 is created by controller 100 of PSA. This type of structure is illustrated in prior application Ser. No. 233,235 incorporated by reference herein. The controller also generates a synchronizing output on line 180 for use in coordinating a number of separate welders of either standard design or using the present invention as shown in FIG. 6. By using the software of a single controller 100, the reduced switch current feature is possible.

Figure 2:
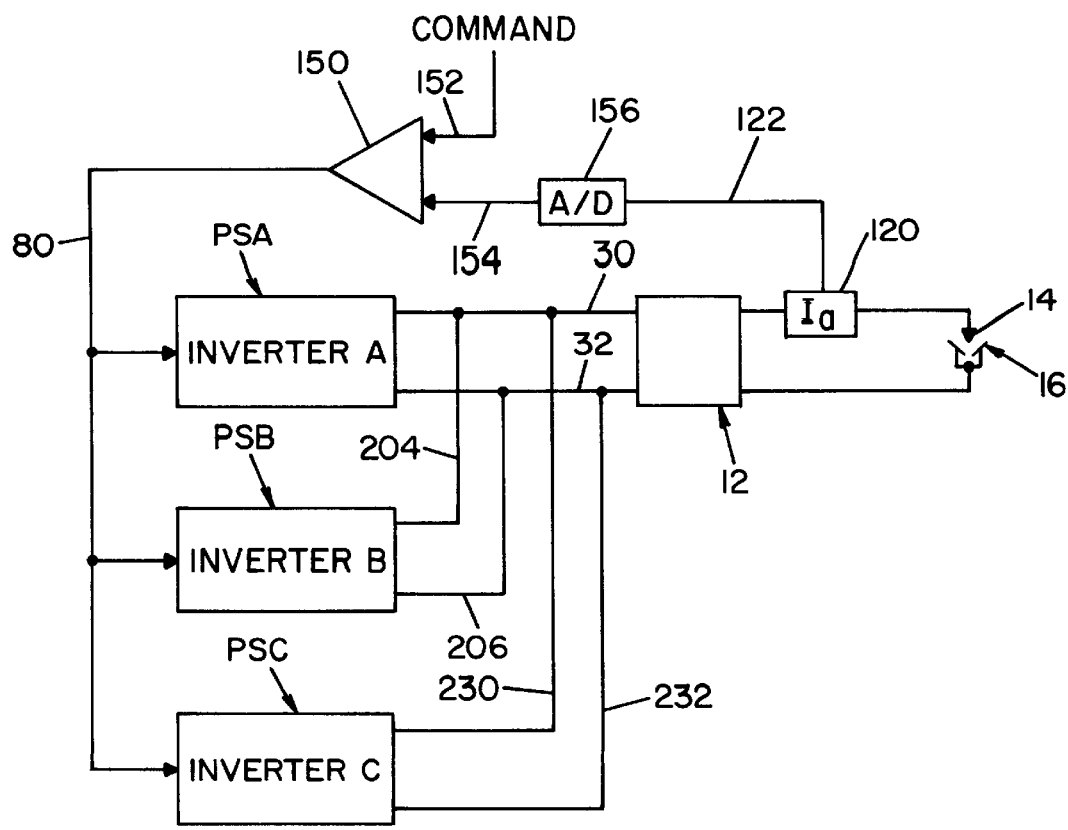
FIG. 2 is a simplified wiring diagram illustrating the preferred embodiment of the present invention when the welder uses more than two power supplies.

As so far described, power supply PSA, which is considered as the "master" power supply, provides D.C. current to terminals 30, 32 in accordance with the master current signal in line 80. The invention employs a plurality of power supplies which includes at least one slave power supply illustrated as power supply PSB. This slave power supply is essentially the same as master power supply PSA, except it does not have a separate controller 100 or a separate feedback circuit. Consequently, PSB includes a standard switching type converter 200, like inverter 20, having an output stage 202 which is essentially the same as output stage 22 of inverter 20. D.C. current in lines 204, 206 is directed in parallel to input terminals 30, 32 of welding station 12 so that the current from PSA and the current from PSB are combined to provide the input current for the welding station. As in power supply PSA, power supply PSB includes a rectifier 210 driven by three phase line voltage L1, L2 and L3 in a manner that the pulses on input line 212 controls pulse width modulator 220 operated at a high frequency, in excess of 18 kHz controlled by the frequency of oscillator 222. Output current across lines 204, 206 is controlled by the voltage forming master current digital signal on line 80 changed to an analog signal by converter 224. The invention anticipates the use of more than two power supplies in electric arc welder 10. Thus, line 80 on which is carried the master current signal is shown as being extended. This line is used to control a third power supply PSC, as shown in FIG. 2. The third power supply creates its own current in lines 230, 232 connected in parallel to input terminals 30, 32.

Figure 3:
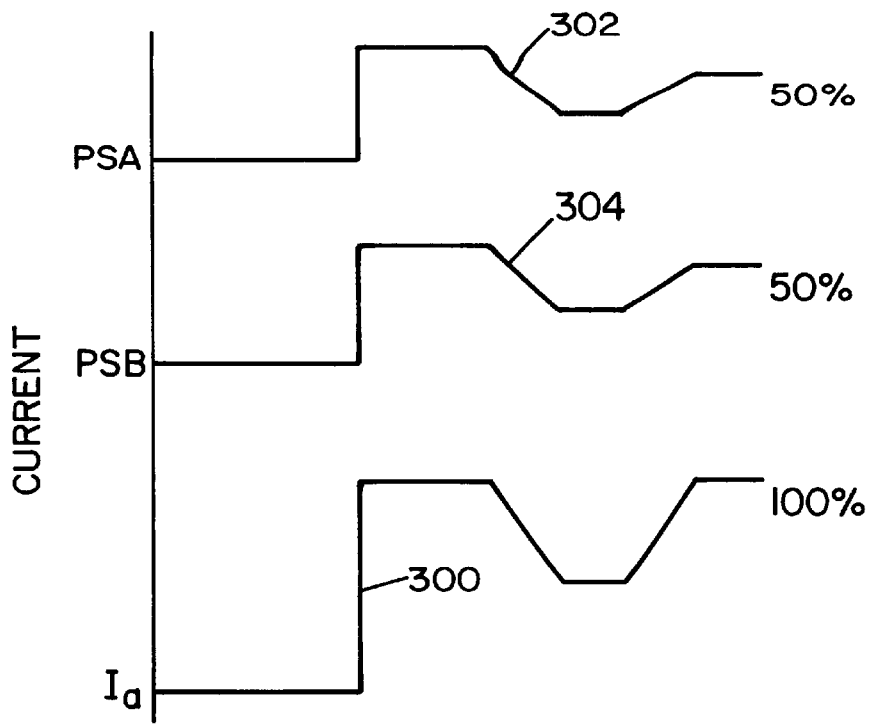
FIG. 3 is a graph showing the D.C. currents provided by a two power supply electric arc welder constructed in accordance with the present invention.
Figure 4:
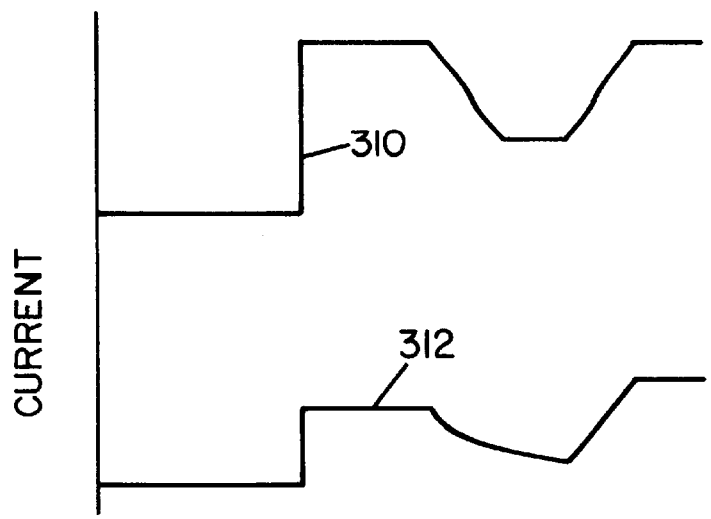
FIG. 4 is a graph similar to FIG. 3 illustrating the current sharing deficiencies of the prior art.
Figure 5:
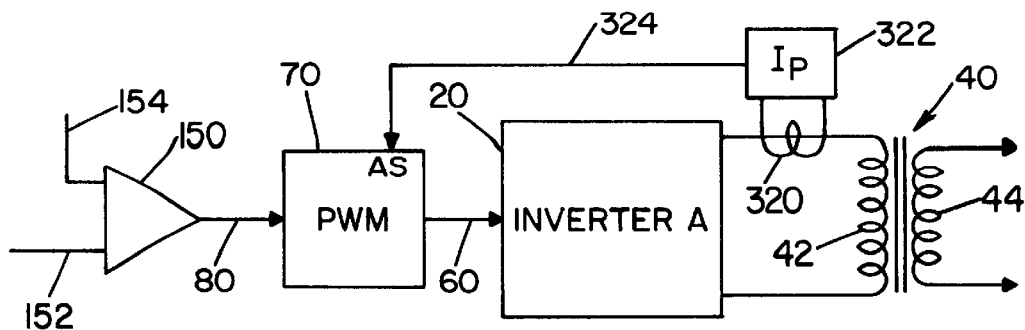
FIG. 5 is a partial block diagram disclosing the use of an anti-core saturation circuit for the pulse width modulator chip of the individual power supplies used in FIG. 1.

In operation, the welding station 12 is controlled by a command signal on lines 104 or 110. The digital feedback circuit applies the sensed arc current in a digital format represented by line 154 for comparison with the digital information on line 152 to create the digital master current signal represented by line 80. Of course, the "lines" on FIG. 1 are representative of software processing of digital data. The master current signal is representative of the difference between the desired current and the actual output current. This signal will be generally the reciprocal of the number of power supply units in electric arc welder 10. As illustrated in FIG. 1, the master current signal is a signal asking each of the power supplies for one half of the desired current. In FIG. 2, the master current signal asks each power supply for one third of the desired current. Consequently, each of the power supplies will provide the same amount of current, which currents are added at terminals 30, 32 for providing the desired welding current. Welder 10 has excellent static and dynamic current sharing capabilities and allows a large number of power supplies with small current ratings to be combined to produce high output currents for electric arc welder 10. The operation of arc welder 10 is schematically illustrated in FIG. 3 wherein graph 300 is the total arc welding current comprising 50% from power supply PSA represented by curve 302 and 50% from power supply PSB represented by curve 304. By using a single digital master current signal represented by line 80 for controlling all power supplies constituting the welder, each of the power supplies produces an equal share of the total current. A single feedback circuitry adjusts this current level. Small power supplies can be combined to produce a welder having output currents in excess of 2000–3000 amperes. In the prior art, as shown in FIG. 4, the output currents from paralleled power supplies having their own command signal, controller 100 and feedback circuitry results in graphs 310, 312 which do not provide equal current components.

Figure 1A:
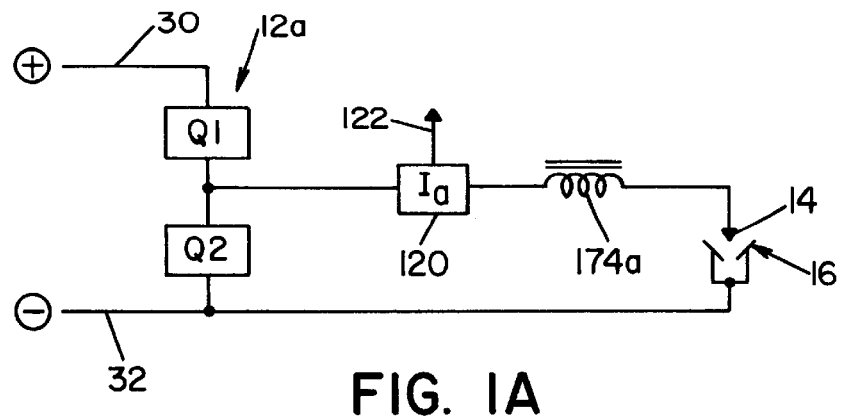

FIG. 1A illustrates a slight modification of the welding station 12 of electric arc welder 10. Even though the welding station is not a part of the invention, an alternative welding station 12a is shown. In this station, transistor type switches Q1, Q2 provide welding current $I_a$ to an output circuit including a series choke 174a, instead of a center tap choke 174 used in the preferred embodiment. Both embodiments of the welding station use a plurality of power supplies, such as PBSA, PBSB, PBSC, etc.

In the preferred embodiment of the present invention, each of the power supplies is provided with a circuit to prevent over current, especially during startup. The circuit used for the power supplies is illustrated for use in power supply PSA. In practice, this same circuit is used for all of the power supplies. Pulse width modulator 70 has a standard anti-core saturation circuit actuated by the level of voltage on terminal AS. Output transformer 40 has a current transformer 320 for sensing the primary winding current $I_P$ as indicated by box 322. The voltage on line 324 has a voltage representing the primary winding current. As the voltage on line 324 increases beyond a certain level, the anti-choke saturation circuit in the PWM chip blocks operation of one of the switches or FET in inverter 20 to reduce the output current at primary winding 42. Thus, in accordance with standard practice, the output current of power supply is limited to prevent over current operation.

Figure 7:
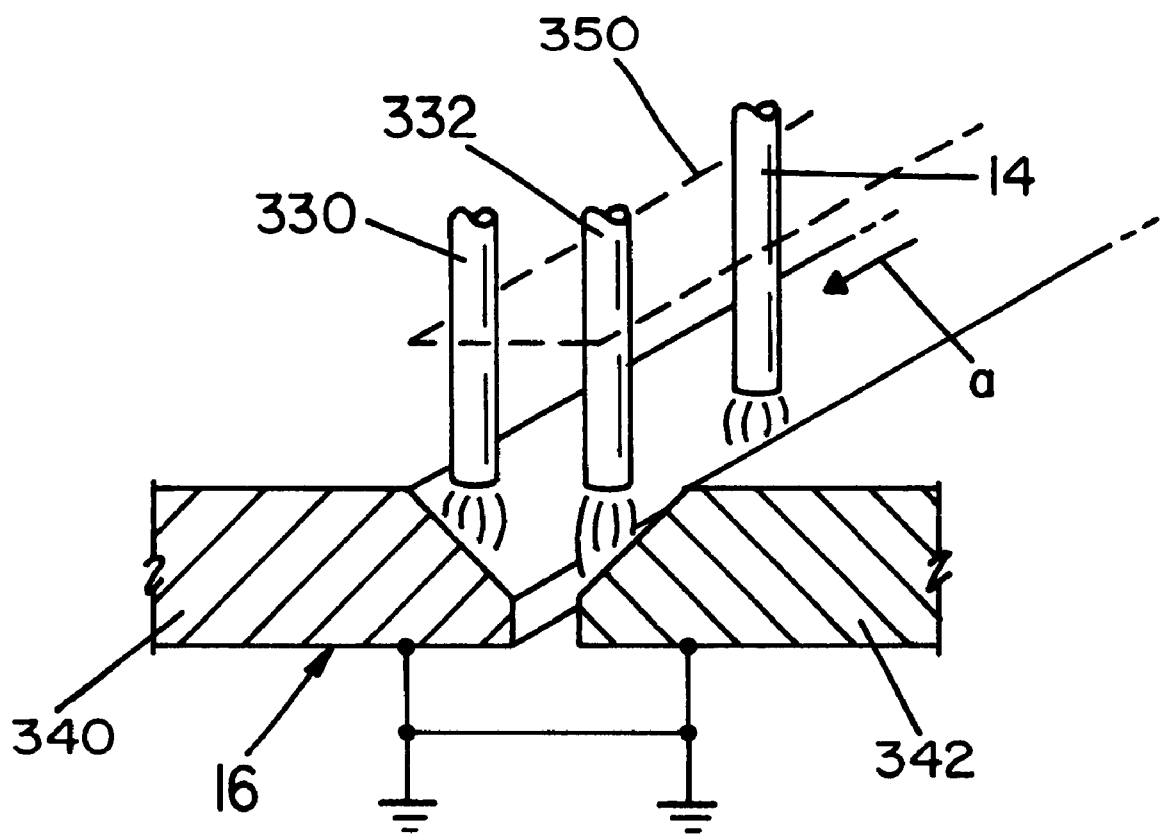
FIG. 7 is an enlarged partially cross sectioned view of side-by-side electrodes and a tandem mounted electrode for using the present invention as illustrated in FIG. 5.

As illustrated in FIGS. 6 and 7, the present invention has substantial versatility and can be used in many applications requiring high welding currents. FIGS. 6 and 7 show two separate electric arc welders 10, and 10a both constructed in accordance with the invention. Welder 10b is a standard welder having only the master power supply. Welders 10, 10a and 10b are used in pipe welding wherein three electrodes 14, 330 and 332 are moved along the gap between plates 340, 342 constituting workpiece 16. The electrodes are illustrated as being side-by-side as well as tandem and are held for unitary movement by carriage 350, illustrated as a dashed line structure. The three electrodes are held together by a carriage 350 that is moved in the direction indicated by arrow a in the joint between plates 340, 342. The three electrodes are illustrated as driven by the three separate electric arc welders 10, 10a and 10b to provide a unitary welding operation. Of course, a single electrode, side-by-side electrodes and/or a tandem arrangement of two or more electrodes can be used with separate electric arc welders. When using separate welders for the electrodes, the welding stations 12 are operated at either different frequencies or at the same frequency with an adjusted phase indicated by 360, 362 in FIG. 6. Each of the welders 10, 10a and 10b includes its own controller 100, 100a and 100b that controls the frequency of the gate logic signals on lines 170, 172. Synchronizing signal 180 controls the starting position of the output current pulses by use of controllers 100a and 10b. The phase or offset is adjusted at welders 10a and 10b by phase adjustments 360, 362. In this manner, the low frequency switching of the transistor type switches Q1, Q2 is at a different phase for all welders. This prevents interference between the current driving the electrodes. In accordance with the invention, various modifications can be made in the preferred embodiment such as the selection of the number of power supplies driven by the single master current signal and the type of welding stations and electrode arrangements. They can be operated analog or digital.

The processing format is digital; however, it is shown and can be analog. Indeed, PWM clips 70, 220 are analog. They can be digitized in subsequent generation of the invention.

Having thus defined the invention, the following is claimed:

1. An electric arc welder comprising plurality of power supplies for creating a D.C. current of a given magnitude controlled by an adjustable command signal for use by a welding station having a D.C. input current and an output to pass an arc welding current between an electrode and workpiece and an arc current sensor, said plurality of power supplies including a first master power supply and at least one slave power supply, said first master power supply and said at least one slave power supply simultaneously providing current to said D.C. input current, said first master power supply including a first high speed switching type inverter having an output transformer and an output rectifier to produce a first D.C. current having a magnitude determined by a master current signal and a first pulse width modulator operated at a high frequency and having a current control voltage input connected to said master current signal, and an error amplifier for creating said master current signal based upon a comparison of said command signal and said sensed arc current, said at least one slave power supply including a second high speed switching type inverter having an output transformer and an output rectifier to produce a second D.C. current having a magnitude determined by said master current signal and a second pulse width modulator operated at a high frequency and having a current control voltage input connected to said master current signal of said master power supply whereby said first and second D.C. currents combine to form at least a portion of said D.C. input current.

2. An electric arc welder as defined in claim 1 wherein said plurality of power supplies includes at least a second slave power supply, said first master power supply and said at least two slave power supplies simultaneously providing current to said D.C. input current, said second slave power supply including a third high speed switching type inverter having an output transformer and an output rectifier to produce a third D.C. current having a magnitude determined by said master current signal and a third pulse width modulator operated at a high frequency and having a current control voltage input connected to said master current signal of said master power supply whereby said first, second and third D.C. currents combine to form at least a portion of said D.C. input current.

3. An electric arc welder as defined in claim 2 wherein said welding current is an A.C. current.

4. An electric arc welder as defined in claim 2 wherein said high frequency is at least about 18 kHz.

5. An electric arc welder as defined in claim 1 wherein said welding current is an A.C. current.

6. An electric arc welder as defined in claim 5 wherein said high frequency is at least about 18 kHz.

7. An electric arc welder as defined in claim 5 wherein said welding station includes first and second transistor type switches shifted between a conductive state and a non-conductive state by the gate logic on a control line.

8. An electric arc welder as defined in claim 7 including means for shifting said switches from the conductive state to the non-conductive state only when said arc current is less than a given value.

9. An electric arc welder as defined in claim 7 wherein said output transformer in said power supplies includes a winding, a current sensor associated with said winding and a circuit associated with the pulse width modulator of said power supply to hold at least one of said switches non-conductive for a time when said current in said winding exceeds a given current.

10. An electric arc welder as defined in claim 1 wherein said high frequency is at least about 18 kHz.

11. An electric arc welder as defined in claim 10 wherein said welding station includes first and second transistor type switches shifted between a conductive state and a non-conductive state by the gate logic on a control line.

12. An electric arc welder as defined in claim 11 including means for shifting said switches from the conductive state to the non-conductive state only when said arc current is less than a given value.

13. An electric arc welder as defined in claim 12 wherein said given value is about 100–150 amperes.

14. An electric arc welder as defined in claim 13 wherein said given value is about 100–150 amperes.

15. An electric arc welder as defined in claim 13 wherein said electrode is one of a plurality of electrodes in a tandem and/or a side-by-side welding machine.

16. An electric arc welder as defined in claim 15 wherein said welding machine is a pipe welder.

17. An electric arc welder as defined in claim 12 wherein said electrode is one of a plurality of electrodes in a tandem and/or a side-by-side welding machine.

18. An electric arc welder as defined in claim 17 wherein said welding machine is a pipe welder.

19. An electric arc welder as defined in claim 11 wherein said output transformer in said power supplies includes a winding, a current sensor associated with said winding and a circuit associated with the pulse width modulator of said power supply to hold at least one of said switches non-conductive for a time when said current in said winding exceeds a given current.

20. An electric arc welder as defined in claim 19 wherein said electrode is one of a plurality of electrodes in a tandem and/or a side-by-side welding machine.

21. An electric arc welder as defined in claim 20 wherein said welding machine is a pipe welder.

22. An electric arc welder as defined in claim 11 wherein said electrode is one of a plurality of electrodes in a tandem and/or a side-by-side welding machine.

23. An electric arc welder as defined in claim 22 wherein said welding machine is a pipe welder.

24. An electric arc welder as defined in claim 1 wherein said welding station includes first and second transistor type switches shifted between a conductive state and a non-conductive state by the gate logic on a control line.

25. An electric arc welder as defined in claim 24 including means for shifting said switches from the conductive state to the non-conductive state only when said arc current is less than a given value.

26. An electric arc welder as defined in claim 25 wherein said given value is about 100–150 amperes.

27. An electric arc welder as defined in claim 24 wherein said output transformer in said power supplies includes a winding, a current sensor associated with said winding and a circuit associated with the pulse width modulator of said power supply to hold at least one of said switches non-conductive for a time when said current in said winding exceeds a given current.

28. An electric arc welder as defined in claim 1 wherein said electrode is one of a plurality of electrodes in a tandem and/or a side-by-side welding machine.

29. An electric arc welder as defined in claim 28 wherein said welding machine is a pipe welder.

30. An electric arc welder as defined in claim 1, wherein said first master power supply and said at least one slave power supply providing a proportional D.C. input current that is inversely proportional to the number of power supplies.

31. An electric arc welder as defined in claim 30, wherein said first master power supply and said at least one slave power supply equally providing said D.C. input current.

32. A circuit for controlling, in accordance with an adjustable command signal, a plurality of power supplies each operated by the voltage directed to the input of a pulse width modulator and connected to a common welding station having a D.C. input current and an output to pass an arc welding current between an electrode and workpiece and an arc current sensor, said circuit comprises an error amplifier for creating a master current voltage signal based upon a comparison of a command signal and said sensed arc current and a distribution circuit connecting said master current voltage signal to input of the pulse width modulators of said power supplies whereby each power supply provides a proportional D.C. current to said common welding station inversely proportional to the number of power supplies in said plurality.

33. An electric arc welder as defined in claim 32 wherein said welding current is an A.C. current.

34. An electric arc welder as defined in claim 32 wherein said welding station includes first and second transistor type switches shifted between a conductive state and a non-conductive state by the gate logic on a control line.

35. An electric arc welder as defined in claim 34 including means for shifting said switches from the conductive state to the non-conductive state only when said arc current is less than a given value.

36. An electric arc welder as defined in claim 35 wherein said given value is about 100–150 amperes.

37. An electric arc welder as defined in claim 32 wherein said electrode is one of a plurality of electrodes in a tandem and/or a side-by-side welding machine.

38. An electric arc welder as defined in claim 37 wherein said welding machine is a pipe welder.

39. An electric arc welder comprising a plurality of power supplies connected to a single welding station with a D.C. input for passing an arc welding current across an electrode and workpiece, each of said power supplies including a switching type inverter with an output D.C. current determined by a signal applied to the input of said power supply, a circuit connecting said output D.C. currents in parallel at the input of said welding station, a feedback circuit including a sensor for creating a current signal representing said arc current, a command signal source, and a circuit for creating a master current signal based upon said sensed current signal and said command signal, and a circuit for applying said master current signal to the input of said plurality of power supplies whereby the D.C. current to said D.C. input of said welding station is equally shared by said power supplies.

* * * * *